United States Patent [19]

Lehto et al.

[11] Patent Number: 5,079,931

[45] Date of Patent: Jan. 14, 1992

[54] BENDING OR SUPPORTING MOULD FOR GLASS SHEETS

[75] Inventors: Esko O. Lehto, Kangasala; Jukka H. Vehmas, Tampere, both of Finland

[73] Assignee: Tamglass Oy, Tampere, Finland

[21] Appl. No.: 571,971

[22] Filed: Aug. 24, 1990

[30] Foreign Application Priority Data

Mar. 30, 1990 [FI] Finland .................................. 901602

[51] Int. Cl.$^5$ .................................................. C03B 27/04
[52] U.S. Cl. .......................................... 65/288; 65/106; 65/273; 65/350; 65/351
[58] Field of Search ................... 65/106, 107, 182.2, 65/273, 350, 351, 287, 288

[56] References Cited

U.S. PATENT DOCUMENTS

| | | | |
|---|---|---|---|
| 3,468,645 | 9/1969 | McMaster et al. | 65/107 X |
| 3,526,489 | 9/1970 | McPhail | 65/287 X |
| 3,819,349 | 6/1974 | Shimizu et al. | 65/287 X |
| 4,767,437 | 8/1988 | Lampman et al. | 65/106 X |
| 4,767,439 | 8/1988 | Reunamaki | 65/351 |
| 4,802,903 | 2/1989 | Kuster et al. | 65/106 |

Primary Examiner—Robert L. Lindsay
Attorney, Agent, or Firm—Burns, Doane, Swecker & Mathis

[57] ABSTRACT

The invention relates to a glass sheet bending or supporting mould which is made primarily by casting of a ceramic material and which includes a curving or flat shaping surface, a number of orifices (10, 11) in a shaping surface (7, 8) as well as channels (16, 17) extending through the mould material and in communication with orifices (10, 11). Said channels (16, 17) are formed as distribution channels common to a plurality of orifices (10, 11) and connected to each other by means of transverse connecting channels (161, 171) for building a ladder-like or lattice-like distribution manifold (16, 161; 17, 171). The invention relates also to a mould manufacturing method, wherein a ceramic-based material is cast in a manufacturing mould which, prior to a casting operation, is fitted with a temporary filling matching a desired distribution manifold and having a ladder-like or lattice-like configuration. Following a casting operation, the temporary filling is removed by using at least one of the following methods: baking for discharging the filling material as flue gases; dissolving with a solvent; heating for turning or releasing the material to a flowing or running state.

19 Claims, 3 Drawing Sheets

BENDING OR SUPPORTING MOULD FOR GLASS SHEETS

The present invention relates to a glass sheet bending or supporting mould which is made primarily by casting of a ceramic material and which includes a curving or flat shaping surface, a number of orifices in the shaping surface and channels extending through the mould material and in communication with the orifices.

The invention relates also to a method for manufacturing a glass sheet bending or supporting mould, which method involves casting of a ceramic-based material into a mould-casting mould which defines the shaping surface of a bending or supporting mould to be cast.

In the further processing of glass there is plenty of use for hot-gas jets. The jets are capable of providing a good heat transfer coefficient, a heat transfer nearly independent of emissivity, effective heat localization, a gas support and non-contacting press bending. Thus, the applications are abundant. However, production of appropriate hot-gas jets involves problems as well. First of all, it is difficult to fabricate an extensive, orificed shaping surface of a desired configuration which retains its shape accurately at a rising temperature. In practice, this means that a mould or the like must be made of a ceramic-based material, whereby the thermal expansion remains low if necessary. Other materials, especially metals, have too high a thermal expansion for controlling the situation as temperature of the mould rises close to a glass softening temperature (630° C.). On the other hand, the use of ceramics is rather expensive and the working of ceramics creates more problems. If, after all, a mould provided with orifices is obtained, there will be another problem: escape of the air blown through the mould orifices in between mould and glass. It has happened in practice that the air escaping from between glass and a bending mould causes intensification of heat transfer in undesired areas, whereby e.g. the bending of glass is poorly controllable. In addition, the escaping air disturbs effective the inflow blast and the system goes out of balance. This problem is resolved by providing the gas with a controlled escape which is best designed by making inlet or outlet orifices parallel to the blasting orifices, the design being referred to as double channeling. Setting up a double channeling has caused major problems in terms of unreasonably high expenses or it has not been possible to build a desired channel system at all e.g. in connection of curved-surface bending moulds.

With modern technology it is possible to design a ceramic mould which is only provided with either a suction or blasting channel system. One practical approach is to drill holes through an entire plate-like mould, whereby a positive or negative pressure must be generated over the entire mould. A problem here is how to make a joint between the mould-entering channel and and the mould itself. Another problem is the actual drilling. This is particularly problematic whenever the question is about major surfaces, whereby the plate becomes very thick and the drilling will be deep and accuracy is easily disturbed.

Another possibility is to use a ceramic to design a mould provided with chambers and fitted e.g. with a pipe joint. The holes are drilled through a thin jacket. A problem is how to design a chamber and the presence of ceramic mould reinforcements which prevent the drilling of holes in every section.

Both methods are useful and offer a benefit of uniform speed distribution. However, these methods cannot be applied to double channeling.

U.S. Pat. No. 4,767,437 discloses a double channeled overhead vacuum pickup provided with a channeling for both blasting air and suction air.

The suction air channel system is designed in the above-described fashion by drilling holes through the entire plate-like pickup and by placing the top surface of the pickup in a vacuum chamber. The fitting and tightening between mould and vacuum chamber cause problems. The blasting channel system is designed by using large channels inside the pickup, the other ends of said channels being connected with a pressure chamber located along one side of the pickup. The blasting orifices are drilled through the mould material from the pickup surface to the internal channels. Also this solution involves a problem of joining and sealing the ends of the channels with a common inlet air pipe. Thus, designing a double channeling with this prior known arrangement is tedious and expensive even when the question is about flat shaping surfaces. Particularly complicated and expensive, if not impossible, would be the application of this prior art manufacturing technique to the double channeling of curved shaping surfaces.

An object of the invention is to provide an improved mould, wherein the channeling is designed inside the mould in a manner that there is no need for out-of-mould vacuum or positive pressure chambers as part of the channel system. A particular object of the invention is to provide a mould, wherein double channeling is also designed in a simple manner entirely inside the mould.

Another object of the invention is to provide a novel mould fabrication method for carrying out a desired channeling, including double channeling, readily by means of intra-mould channels. A particular object of the invention is to provide a method for readily designing an intra-mould channel system and also a double channel system in a desired configuration also in connection of curved surface moulds.

These objects are achieved on the basis of the characterizing features set forth in the annexed claims.

A few embodiments and designs of the invention will now be described in more detail with reference made to the accompanying drawings, in which.

Figure 1:
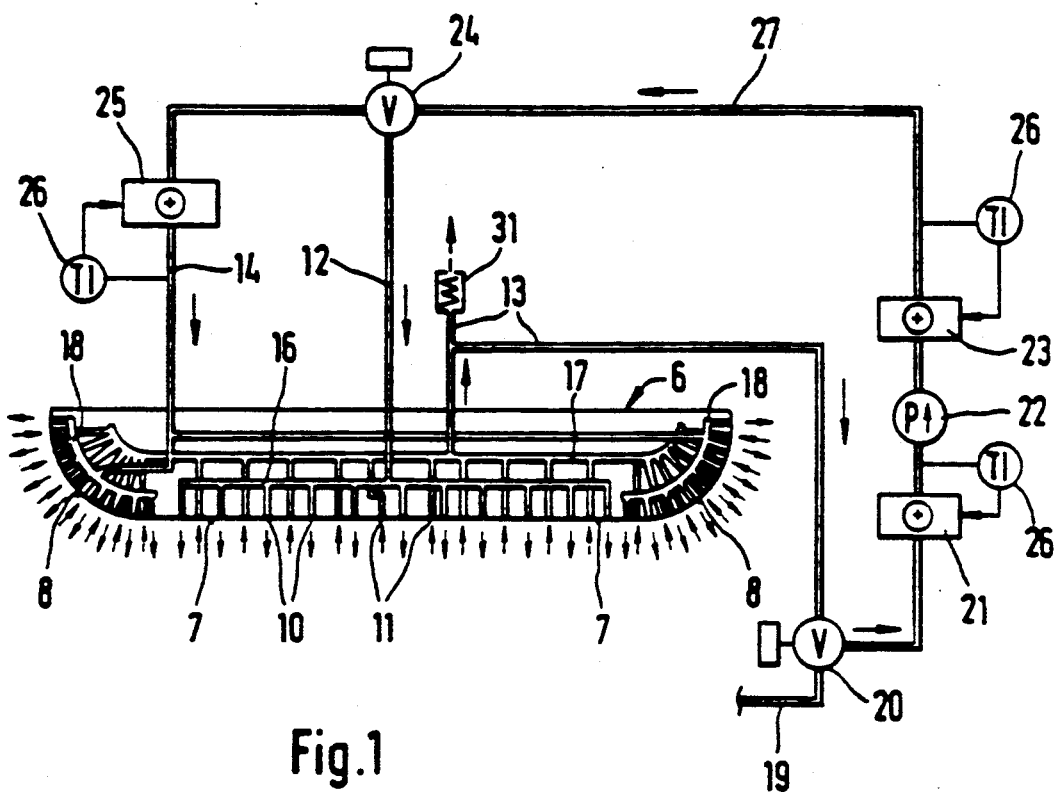
FIG. 1 shows schematically a mould according to one embodiment of the invention and its application as a non-engaging press bending mould.
Figure 1A:
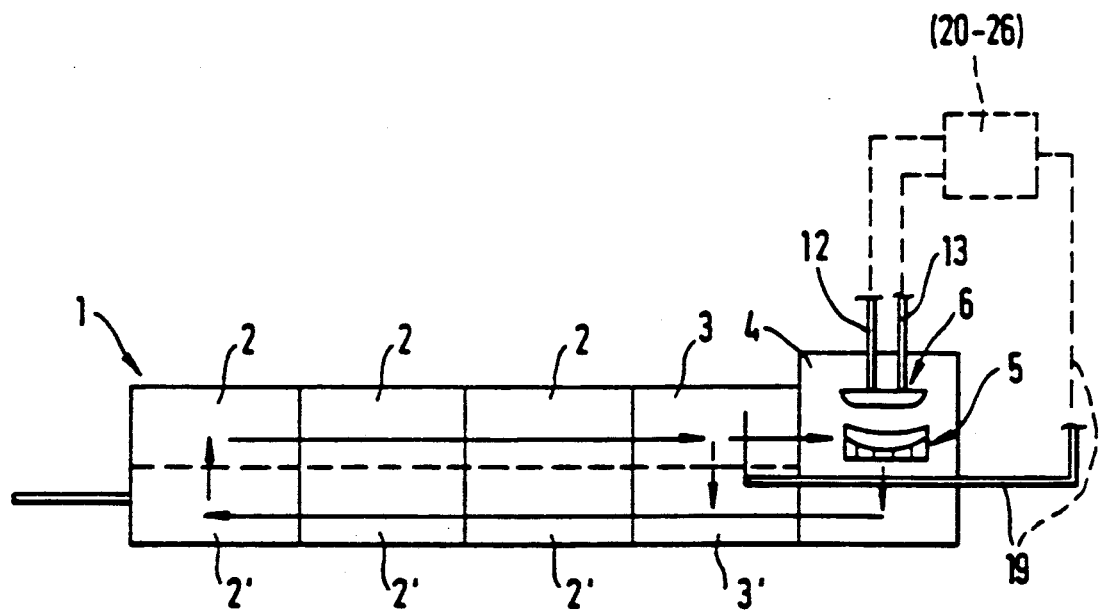

The embodiment of FIG. 1 shows a press provided with a blasting manifold 16 and a suction manifold 17 and with a less curving or flat partial shaping surface 7 and a more curving partial shaping surface 8 which, within the mould corner areas, can also be a part of spherical surface.

The press bending mould 6 is placed in a bending section 4 for complicated bending shapes, into which a hot glass sheet supported by an outline or ring-type mould 5 is carried from the final heating section 3. Heating of a glass sheet is effected step by step in successive heating sections 2. A bent glass sheet is gradually cooled in successive cooling sections 3', 2'. A windshield bending furnace generally indicated by reference numeral 1 is described in more detail in U.S. Pat. No. 4,497,645.

Orifices 10 are connected to blasting-air distribution manifold 16 and orifices 11 are connected to suction-air collecting manifold 17. In curving shaping surface sections 8 and in the immediate vicinity thereof, said blasting air orifices 10 are connected to separate distribution manifold sections 18. Distribution manifolds 16 and 18 are connected by way of blasting air pipes 12 and 14 to an adjustable three-way valve 24 for adjusting the relative amount of blasting air between pipes 12 and 14. Valve 24 is connected by way of a blasting air pipe 27 to the pressure side of a fan 22. The suction side of fan 22 is connected to an adjustable three-way valve 20 for adjusting the relative proportions of the amounts of air coming from a pipe 19 and a pipe 13. Pipe 13 is connected to said suction-air collecting manifold 17 of the mould and pipe 19 is connected to the interior of the hottest section 3 of furnace 1. Thus, valve 20 is capable of controlling the effect of suction prevailing on the shaping surface in relation to the effect of blowing. On either side of fan 22 there are heaters 21 and 23 which are controlled by thermostats 26. The blasting pipe branch 14 can further be fitted with a controllable heater 25 for blowing hotter air to the most curving shaping surface sections 8 and to the immediate vicinity thereof than to the less curving section 7.

In a glass sheet bending operation, a greater blasting air thermal effect is required in the areas subjected to the greates deformation (deflection and/or elongation) of a glass sheet. When using a mould of the invention, this objective can be achieved in a variety of ways also when using a single integrated blasting air distribution manifold 16. One useful approach is to apply a greater amount of blasting air wherever more heat is required. Therefore, the pitch of orifices can be made irregular. In other words, the orifices are in a more dense pattern in those surface regions which require more heating. Another possibility is to include orifices of varying sizes within different areas of a shaping surface. Yet another possibility is to locate resistance heating elements (see resistance 28 in FIG. 4) in different parts of distribution manifold 16 or 18. Power is supplied to the resistance heating elements from a power source 30 by way of wires 29.

A novel and unique feature of the invention is the design of blasting air distribution manifold 16, 18 as well as that of collection manifold 17.

Figure 2:
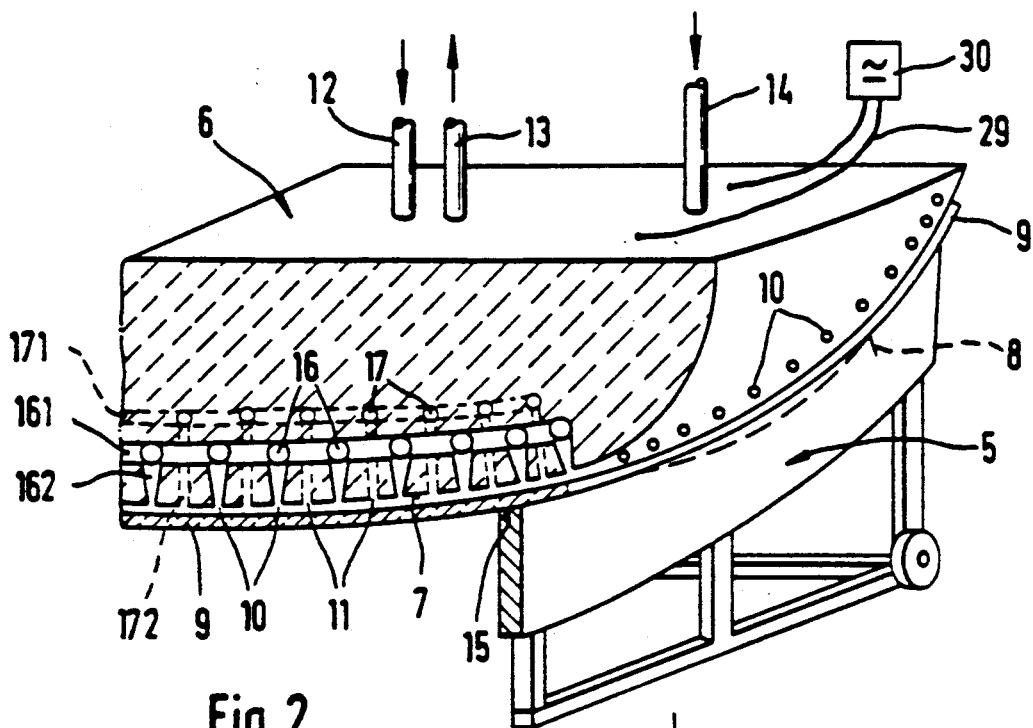
FIG. 2 shows a vertical section of a portion of a mould of the invention in an operating situation with the mould serving as a press bending mould.

As shown in FIG. 2, the blasting air distribution channels 16 are connected to each other by means of transverse connecting channels 161. The suction air collection channels 17 are also connected to each other by means of transverse connecting channels 171. Thus, the distribution channels 16 and connecting channels 161 build a ladder-like or lattice-like distribution manifold. In a similar manner, the collection channels 17 and connecting channels 171 build a ladder-like or lattice-like collection manifold. Both ladder-like or lattice-like manifolds extend themselves within the mould at least substantially in the same direction as the shaping surface. The individual channel members of manifolds 16, 161 or 17, 171 can extend in a zigzag fashion and also diverge substantially from the direction of a shaping surface. In a preferred case, the individual channel members are also, at least for the most part, parallel to the shaping surface. Between distribution manifold 16, 161 and orifices 10 extend tapering nozzle channels 162. In a similar manner, between collection manifold 17, 171 and orifices 11 extend tapering nozzle channels 172. In the embodiment of FIG. 2 such a double manifold is required for effecting a non-engaging press bending operation to a glass sheet 9. A heat glass sheet is supported on an outline mould 5 provided with a shaping surface 15 to match a desired final bending shape. The upper press bending mould 6 is also provided with a shaping surface 7, 8 to match a final desired bending shape. As the shaping surface 7, 8 of mould 6 approaches a glass sheet, the air blasted from orifices 10 heats the glass sheet to simultaneously build a pressure effect between shaping surface and glass sheet. The excess air escapes through orifices 11. The pressure between shaping surface 7, 8 and glass sheet 9 increases dramatically if the glass sheet tends to engage the shaping surface. Other than that, there should be no pressure fluctuations resulting from the mechanical construction. An object of the ladder-like or lattice-like distribution manifold 16, 161 and, accordingly, that of collection manifold 17, 171 is to create an equal flow from various orifices 10 or orifices 11, the manifold serving to equalize possible pressure peaks. Pressure peaks can also be compensated for by a stepwise design of the distribution manifold, which is not shown in FIG. 2 but which can be obtained by using a mould manufacturing method described in connection with FIGS. 3 and 4.

Each individual distribution manifold 16, 161 or manifold section (18 in FIG. 1) has at least one pressure pipe 12, 14 connected thereto. Accordingly, the collection manifold 17 has at least a single suction pipe 13 connected thereto.

The orifices 10 and 11 can have a diameter of 2–10 mm, e.g. 5 mm. The blast and suction orifices can be made either stepwise in adjacent rows or alternately in the same orifice rows. The distance or spacing between blast and suction orifices can be 20–50 mm, e.g. 30 mm.

Figure 3:
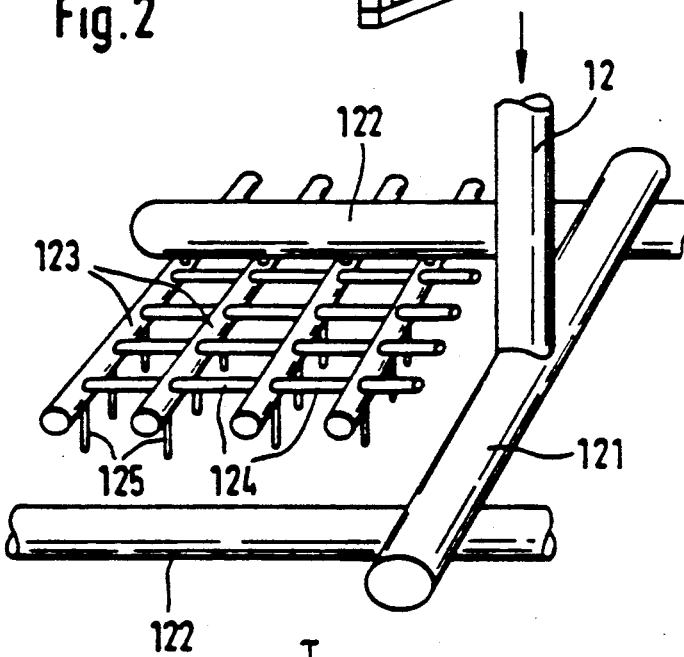
FIG. 3 is a perspective view of a ladder-like or lattice-like temporary filling used in the mould fabrication method for making a distribution channel system or manifold.
Figure 4:
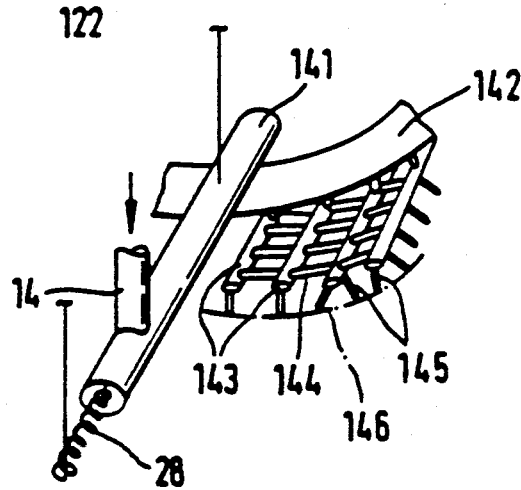
FIG. 4 is a view similar to FIG. 3 showing some of the temporary filling within the area of a curved shaping surface.

The following describes a manufacturing method for a mould provided with a two-stepped distribution manifold with reference made to FIGS. 3 and 4. A ladder or lattice assembly corresponding to a desired distribution manifold is prefabricated of such a material which can be removed during or after the baking stage of a ceramic mould 6. An essential feature is that the material employed does not experience too much heat expansion during the baking stage and thus cause splitting and cracking of the ceramic mould. The applicable materials include e.g. certain types of plastics, certain types of rubbers, some cellular plastics, organic-adhesive bound casting cores (turn to sand after baking), pipes made of low softening point metals etc. A pressure pipe 12 is connected through the intermediary of a branch pipe or a temporary filling member 121 to filling members 122 extending parallel to the shaping surface and forming distribution channels of the first step. On the other hand, filling members 122 are connected through the intermediary of a branch piece to filling members 123, which are parallel to the shaping surface and form a distribution manifold of the second step. Filling members 123 are in turn connected to each other by means of transverse filling members 124 which form connecting pipes 161 between distribution channels 16. Filling members 125 form connecting channels between the distribution manifold and orifices 10. In a similar manner it is possible to build a multi-step distribution manifold conforming to a shaping surface sector 146 by means of filling members 141-144. The density, direction and size of filling members 145 used for building the nozzle channels can be varied according to a given requirement. The filling members can be solid or tubular depending on a material employed.

A filling member corresponding to collection manifold connected with suction pipe 13 and to nozzle manifold 172 can be manufactured in exactly the same way to be a single- or multi-step configuration. The filling members intended for building different manifolds must naturally be designed and dimensioned as well as attached inside a manufacturing mould in a manner to position them in a suitably overlapping, non-engaging relationship relative to each other. In addition, the filling members must be tied and braced in a casting mould so that the latter is capable of withstanding the stress exerted by a casting operation. Following a casting operation, after at least a partial setting of casting mass, mould 6 is removed from the casting mould and the manifolds are created inside the mould by removing the filling material by using one or more of the following methods: Mould 6 is heated or baked in a manner that the filling material escapes as flue gases and/or is incinerated; channels are flushed with a solvent which dissolves and flushes away the filling material or combustion residues; mould 6 is heated to such a high temperature that the filling material converts or releases into a flowing or running state.

In the case of FIGS. 2-4, the distribution manifold 16, 161 and 17, 171 are parallel to the shaping surface in a manner that the manifold is at every point substantially an equal distance away from the shaping surface. The channels can also meander to vary the distance thereof from the shaping surface. Even in this case, however, the general direction of a ladder-like or lattice-like channel assembly follows the direction of a shaping surface. A ladder-like or lattice-like assembly means that parallel channels 16 or 17 are connected to each other at certain spacings by means of transverse channels 161 or 171. The connecting transverse channel 161 or 171 can be smaller than the actual channel but, preferably, the channeling is designed in a manner that both the actual manifold and the connecting manifold are of the same size and the spacing between channels is equal to provide a lattice-like manifold.

Figure 5:
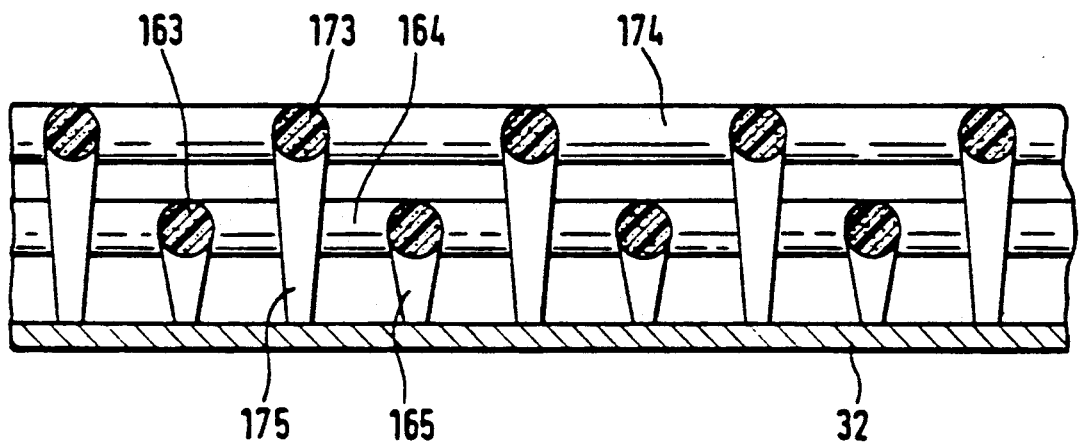
FIG. 5 is a vertical section of some of the temporary filling to form a double channel system, said filling being placed in a mould-manufacturing mould 32.
Figure 6:
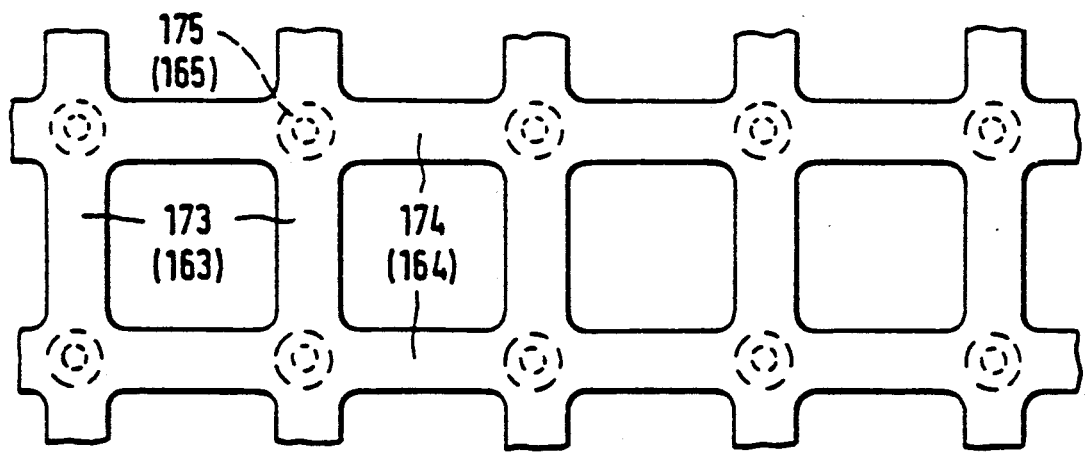
FIG. 6 is a plan view of one of the temporary fillings shown in FIG. 5.

FIGS. 5 and 6 illustrate a temporary filling to be placed in a casting mould for building a lattice-like manifold. Filling members 173 and 174 and respectively 163 and 164 build a regular square lattice whose crossing points are provided with filling members 175 and respectively 165 in the shape of a tapered rod or stub for building nozzle channels 172 and respectively 162. Thus, a casting mould 32 is provided with at least two separate channel filling assemblies in overlying planes in order to build similarly separate distribution and collection manifolds. The tapered rods or stubs 175 of the upper plane or level found their way to apertures in the channel filling of the lower level, the manifolds thus formed remaining separate from each other. The individual channel fillings can also be made of prefabricated sub-elements which are joined together to provide a single integral channel filling. Thus, by using prefabricated standard elements it is possible to build distribution manifolds of varying configurations.

The ladder-like or lattice-like structure of a distribution or collection manifold offers the further benefit that, in case of a possible blocking or a manifold break-up during a mould-building operation, a back-up manifold will be automatically provided. The ladder-like or lattice-like structure further achieves the bracing of a temporary channel filling for the duration of mould manufacture. If the manifold is only built by using individual pipes, there is a hazard of damaging the manifold e.g. during transport or manufacturing.

The benefits offered by a mould of the invention and its manufacturing method include:

facilitates building of mutually independent suction and blasting manifolds in the mould provides a desired orifice pattern and a desired orifice size in a desired area gas can be delivered into the mould and discharged by means of an individual pipe with no complicated joints required between a mould and a gas manifold the use of a ceramic facilitates the control over a mould at high temperatures as a result of low thermal expansion a smooth shaping surface of a desired configuration is obtained by casting if necessary, the mould can be divided into mutually independent sections for creating in various sections of the mould a higher blasting pressure and/or a higher blasting air temperature.

Applications for the mould:

a non-engaging upper press bending mould a lower partial surface mould which facilitates the bending of S-shaped windshields as well as backlights a gas carrying furnace a pickup from a furnace to a bender a lower non-engaging bending bed.

The mould is particularly suitable for the further processing of painted or coated glasses by virtue of a gas film produced by means of the mould.

We claim:

1. A mold for a glass sheet comprising:
   a shaping surface;
   a plurality of orifices disposed in said shaping surface;
   distribution channels in fluid communication with said plurality of orifices, said distribution channels extending through said mold;
   connecting channels in communication with said distribution channels, said connecting channels extending through said mold in a direction substantially transverse to said distribution channels;
   said distribution channels and said connecting channels being interconnected so as to provide at least one lattice-shaped fluid distribution manifold disposed within said mold.

2. A mold for a glass sheet according to claim 1, wherein said distribution manifold extends within said mold in a direction of said shaping surface.

3. A mold for a glass sheet according to claim 1, wherein said distribution channels extend within said mold at least in a direction of said shaping surface.

4. A mold for a glass sheet according to claim 1, wherein a first and second set of distribution channels and a first and second set of connecting channels are respectively interconnected to form a first and second distribution manifold, said first and second distribution manifolds being disposed in different planes within said mold.

5. A mold for a glass sheet according to claim 1, wherein distinct sets of distribution channels and distinct sets of connecting channels are respectively interconnected to form at least two distinct distribution manifolds.

6. A mold for a glass sheet according to claim 1, wherein distinct sets of distribution channels and distinct sets of connecting channels are respectively interconnected to form a distribution manifold having at least two tiers.

7. A mold for a glass sheet according to claim 1, wherein said distribution channels and said connecting channels are interconnected so as to generally follow a contour of said shaping surface.

8. A mold for a glass sheet according to claim 1, wherein said plurality of orifices are space apart from each other according to a contour of said shaping surface.

9. A mold for a glass sheet according to claim 8, wherein said plurality of orifices are spaced closer to each other at a curved contour of said shaping surface than at a less curved contour of said shaping surface.

10. A mold for a glass sheet according to claim 1, wherein said plurality of orifices are each sized according to a contour of said shaping surface.

11. A mold for a glass sheet according to claim 10, wherein said plurality of orifices are sized larger at a curved contour of said shaping surface than at a less curved contour of said shaping surface, and a cross sectional area of said distribution and connecting channels is greater at a curved contour of said shaping surface than at a less curved contour of said shaping surface.

12. A mold for a glass sheet according to claim 1, wherein said distribution manifold includes at least two sub-manifolds, each sub-manifold being associated with a different area of said shaping surface.

13. A mold for a glass sheet according to claim 5, wherein different sized distribution channels and connecting channels are associated with each of said at least two distribution manifolds, and each of said at least two distribution channels are connected to different sized orifices.

14. A mold for a glass sheet according to claim 1, wherein said pluality of orifices are connected to distribution channels at a location including an interconnection of said distribution channels with said connecting channels.

15. A mold for a glass sheet according to claim 1, wherein said plurality of orifices are connected to said distribution channels with tapering nozzle channels.

16. A mold for a glass sheet according to claim 1, wherein a cross-sectional area of said connecting channels is less than a cross-sectional area of said distribution channels.

17. A mold for a glass sheet according to claim 5, wherein a first of said at least two distribution manifolds is connected to means for suctioning fluid, and a second of said at least two distribution manifolds is connected to means for blowing fluid.

18. A mold for a glass sheet according to claim 1, wherein said mold includes means for attaching said mold to a vacuum means for lifting such that said mold may be moved vertically for non-contact bending of a glass sheet.

19. A mold for a glass sheet according to claim 1, wherein said shaping surface is shaped to form complex curves on said glass sheet.

* * * * *